(No Model.)
G. A. BURWELL.
TIRE FOR BICYCLE WHEELS.
No. 483,990. Patented Oct. 11, 1892.
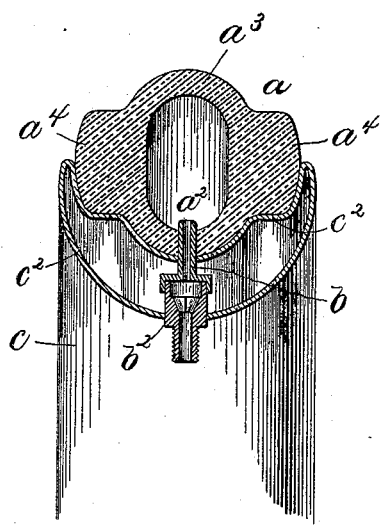
Witnesses.
John F. Nelson
Jas. J. Maloney.
Inventor.
George A. Burwell.
by Jos. P. Livermore
Att'y.

UNITED STATES PATENT OFFICE.

GEORGE A. BURWELL, OF HIGHLANDVILLE, MASSACHUSETTS.

TIRE FOR BICYCLE-WHEELS.

SPECIFICATION forming part of Letters Patent No. 483,990, dated October 11, 1892.

Application filed August 20, 1891. Serial No. 403,159. (No model.)

*To all whom it may concern:*

Be it known that I, GEORGE A. BURWELL, of Highlandville, county of Norfolk, State of Massachusetts, have invented an Improvement in Tires for Bicycle-Wheels, of which the following description, in connection with the accompanying drawing, is a specification, like letters on the drawing representing like parts.

My invention relates to a tire for the wheels of bicycles and similar vehicles, the object being to produce a pneumatic tire or one which normally depends for its elasticity and efficient operation upon a body of compressed air contained within the flexible walls of the hollow tire, but which may also be used effectively in case the air is permitted to escape by a puncture or other defect in the tire.

The invention consists, mainly, in a tire composed of rubber or other flexible and elastic material, having an air-chamber and means for inflating the same, and also having at the sides of said air-chamber thickened walls or extensions arranged to be properly supported in the wheel-rim or felly, so as to constitute an efficient tire in case the air is permitted to escape from the air-chamber. By this construction the tire when in normal working condition has the elasticity and effect of a pneumatic tire; but in case the air is permitted to escape owing to any damage or defect in the tire it also is capable of operating as an ordinary rubber tire, and thus enables the vehicle to be used until proper repairs can be made.

The drawing shows a transverse section of a wheel-rim and tire therein embodying this invention.

The tire $a$ is composed of rubber or other flexible and elastic material which may be suitable for tires of this kind. The said tire $a$ is made hollow or provided with a chamber $a^2$, into which air may be forced through a suitable tube $b$, controlled by a check-valve $b^2$, of any usual construction.

The portion $a^3$ of the wall of the tire that extends farthest from the center of the wheel and normally constitutes the bearing-periphery of the wheel is sufficiently thin, as shown, to yield readily under the weight sustained by the wheel and is retained in its distended condition by the compressed air contained in the chamber $a^2$, so that the elasticity of the tire is derived, mainly, from the compressed air rather than from the elasticity of the material of the tire itself, being thus substantially the same in nature as the well-known pneumatic tires now in use. At the sides of the air-chamber $a^2$ the walls of the tire are thickened or provided with projections $a^4$, which are narrower in the direction radial to the wheel than the main body of the tire, as shown, so that they do not normally support any considerable portion of the load while the portion $a^3$ of the tire remains distended by the compressed air in the chamber $a^2$. The said projections $a^4$ of the tire are supported on suitable shoulders or bearing-seats $c^2$, formed in the wheel-rim $c$, so that in case of collapse of the thin portion $a^3$ of the wall the said side portions $a^4$ are properly supported upon the wheel-rim to sustain the weight carried by the wheel substantially independently of the portion $a^3$, thus acting as an ordinary rubber or cushion tire when the wall $a^3$ of the air-chamber is collapsed.

The tire may be secured in the wheel-rim by cement or other usual means and is preferably made, as shown, of the same shape on its outer or bearing surface and its inner surface that engages with the wheel-rim, so that when one side of the tire has become worn the tire may be turned and used until the other side becomes worn out.

By the herein-described construction the tire as long as its walls remain air-tight and its air-chamber filled with air operates as a pneumatic tire, the radial projection of the thin or flexible portion $a^3$ of the tire being such as to cause it to operate as the main support for the wheel substantially unaffected by the extensions $a^4$; but when said portion $a^3$ for any reason ceases to be properly distended by the contained compressed air the portions $a^4$ operate substantially independently of the said portion $a^3$ as a rubber or cushion tire and constitute an efficient tire for the wheel until the wall of the air-chamber can be repaired.

I claim—

1. The combination of a hollow tire having a continuous flexible wall and outward extensions or thickened portions at the sides thereof with a wheel-rim having a receiving-groove and a seat or shoulder intermediate in the depth of said groove substantially at right angles to the plane of rotation of the wheel, said seat portions engaging the extensions of the tire and supporting the same against pressure toward the center of the wheel, and the side walls of the wheel-rim radially beyond said seats supporting the said extensions of the tire laterally, substantially as described.

2. The herein-described tire, having a continuous flexible wall surrounding and inclosing an air-chamber, said wall being composed of thin curved portions at its inner and outer periphery and having thickened outwardly-projecting side portions $a^4$, the portion of said tube that is embedded in the wheel-rim being the same shape as the portion which projects therefrom to enable said tire to be reversed after its projecting side is worn, substantially as described.

In testimony whereof I have signed my name to this specification in the presence of two subscribing witnesses.

GEORGE A. BURWELL.

Witnesses:
 JOS. P. LIVERMORE,
 JAS. J. MALONEY.